May 9, 1933.    E. KERN    1,908,364
DIRECT CURRENT COMMUTATING SYSTEM
Filed Feb. 26, 1930

Inventor
Erwin Kern
By Alfred H. Dyson
Attorney

Patented May 9, 1933

1,908,364

UNITED STATES PATENT OFFICE

ERWIN KERN, OF WETTINGEN, SWITZERLAND, ASSIGNOR TO AKTIENGESELLSCHAFT BROWN, BOVERI AND CIE., OF BADEN, SWITZERLAND

DIRECT CURRENT COMMUTATING SYSTEM

Application filed February 26, 1930, Serial No. 431,603, and in Germany March 1, 1929.

This invention relates to improvements in system for commutating the current supplied to direct current motors by means of controlled electric valves instead of with the use of a segmental commutator rotated in contact with brushes as is usual at the present time.

A system for commutating the current supply to a direct current motor by means of controlled electric valves is disclosed in my Letters Patent 1,813,056, for commutation of continuous current, dated July 7, 1931, on an application filed November 15, 1928. In the system disclosed in the above identified Letters Patent, the armature winding of the motor is arranged as a polygon divided into a plurality of sections which are connected, at the points of the section connections, through electric valves with the direct current supply. The valves are so controlled that an auxiliary alternating current, impressed on the direct current supplied, periodically causes the flow of direct current through the valves to drop to zero. In the usual windings, the current flows alternately through all sections of the winding and all the points of connection in both directions. When such winding is to be supplied with current through electric valves, it is therefore necessary to provide each connection point supplied with a double valve or valves which will permit the passage of the current alternately in either direction. Assuming that a winding has six such connection points, it will be seen that a large number of double valves is required which result is very undesirable in practice.

It is, therefore, among the objects of the present invention to provide an electric valve controlled commutating system for direct current motors in which single electric valves may be used.

Another object of the invention is to provide an electric valve controlled commutating system for direct current motors having windings divided into a plurality of sections, each of the connection points of the windings being supplied with direct current through a single electric valve.

Another object of the invention is to provide an electric valve controlled commutating system for direct current motors having armature windings divided into a plurality of sections connected in star-polygon, in which windings current is supplied to the common point of the sections so that the current flows in only one direction in each star-connected section.

Figure 1:
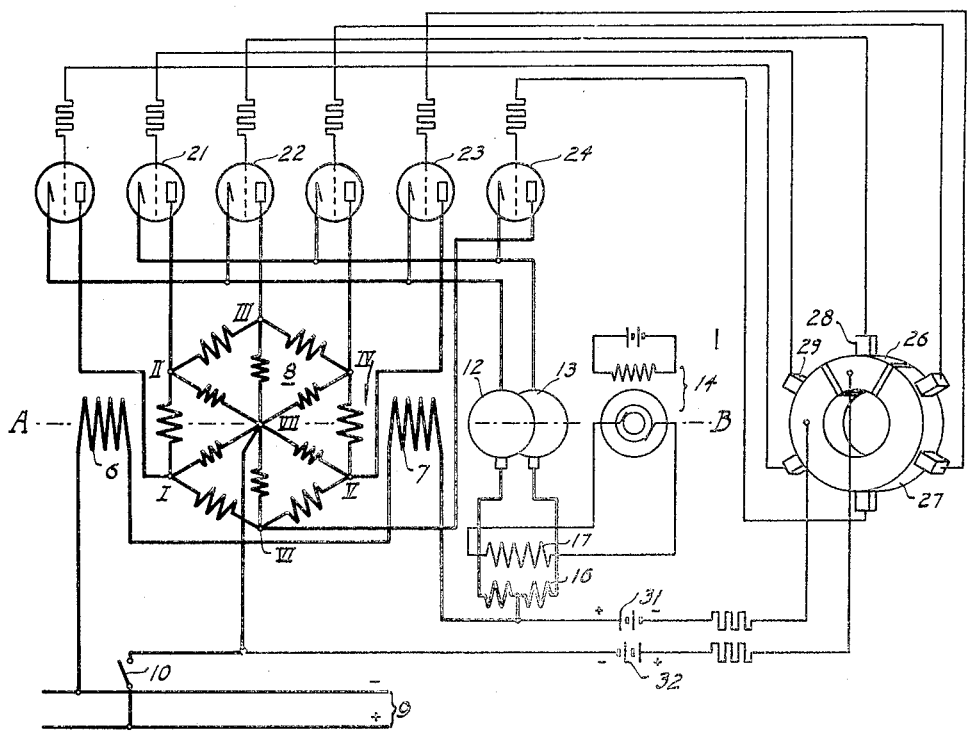
Figure 2:
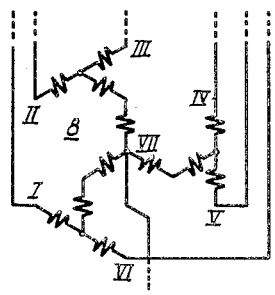
Figure 3:
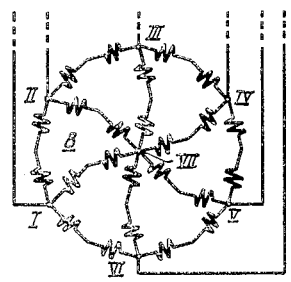
Figure 4:
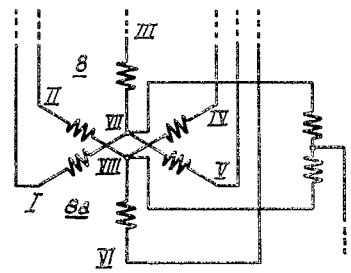

Objects and advantages, other than those above set forth, will be apparent from the following description when read in connection with the accompanying drawing, in which Figure 1 diagrammatically illustrates one embodiment of the present invention in which the armature of an electric valve commutated direct current motor is divided into a plurality of sections which are star-polygon connected, Fig. 2 diagrammatically illustrates another embodiment in which the armature winding sections are connected in open polygon-zigzag, Fig. 3 diagrammatically illustrates an armature winding in which the sections thereof are connected in zigzag-polygon, and Fig. 4 diagrammatically shows an armature winding in which the sections are divided into two star connected sections having the neutral points thereof connected with the source of current supply through an autotransformer.

Referring more particularly to Fig. 1 of the drawing by characters of reference, the reference numerals 6 and 7 designate the several portions of the stationary field windings and reference numeral 8 designates the rotating armature of a direct current motor supplied with current from a source of supply 9 through a switch 10. The armature 8 is shown as being divided into six star-connected sections joined to a plurality of winding sections connected at point I, point II, point III, point IV, point V and point VI to form a star-polygon winding, thereby to secure substantially equal distribution of current through the respective winding sections. The several connection points designated by the Roman numerals I to VI inclusive are connected in star by winding sections having the common neutral point VII.

A pair of slip-rings 12 and 13 and an auxiliary source of alternating current as at 14 are mounted on the shaft of the motor indicated by the line A—B. The slip-rings 12 and 13 are connected with the secondary winding 16 of a transformer, the primary winding 17 of which is connected with the terminals of the alternator 14. The cathodes of each of a plurality of electric valves such as the triode valves shown at 21, 22, 23 and 24 are connected with the slip-rings and the anodes of each of the valves are connected with the connection points of the armature windings. The operation of the valves 21 to 24 inclusive is controlled by a distributor having only two segments 26 and 27 connected with sources of current of opposite polarity such as the batteries 31 and 32. Brushes as shown at 28 and 29 rotate in contact with the distributor 26 and 27 and impress a bias on the grids of the valves 21 and 22. The field windings 6 and 7 are connected in series with the armature through the midpoint of the secondary winding 16.

In operation, the device passes through a constantly recurring cycle of operation, due to the rotation of the armature winding which brings the connection points thereof to the same point successively with relation to the field. When the armature is in the position shown in the drawing, the motor may be started by closing the switch 10. A circuit is then completed from the source of direct current 9 through the switch 10 to the neutral point VII of the armature winding from which point the current flows in multiple series through the various star and polygon winding sections to the point III, and passes through valve 22 over slip-ring 12 and through the left hand section of secondary winding 16 of the transformer, through the fields 7 and 6 and back to the line 9. The grid of the valve 22 has a positive bias impressed thereon while the grids of all the other valves have a negative bias impressed thereon from the battery 31 over the segment 27 and the brushes in contact therewith.

During the next moment of operation when connection point VI has moved half-way from the position shown to the position shown in the drawing for connection point I, the above circuit through the armature winding is continued and a second circuit is also completed from the source of current supply 9 through the switch 10 to point VII and thence through the various winding sections to point II and out through valve 21 over slip-ring 13 and the right hand section of the secondary winding 16 of the transformer and through the field coils 7 and 6 back to the direct current circuit 9. The second of the above-mentioned circuits is possible due to the fact that both valves 22 and 21 have a positive bias impressed thereon from the battery 32 over the distributor segment 26 and through brushes 28 and 29 while the grids of all of the other valves are kept at a negative potential through connection with battery 31 through segment 27 of the distributor and the brushes in contact therewith.

During the next moment of rotation of the armature point VI will have moved to the position shown in the drawing in Fig. 1 for point I. The first of the circuits above mentioned will be interrupted due to the fact that the generator 14, will have impressed on the points II, III, through transformer 16, 17, a voltage of such magnitude as to cause transfer of the whole armature current through the point II. Valve 22 is then without current and, its grid being negatively biased by means of the battery 31 through segment 27 and brush 26, the first circuit mentioned cannot carry current until the armature again reaches the initial position. The second of the above mentioned circuits however remain closed due to the fact that the grid or valve 21 still has a positive bias impressed thereon from the battery 32 over the distributor segment 26 and the brush 29 in contact therewith. All of the grids of the other valves are kept at a negative potential from the battery 31 over the distributor segment 27 and the brushes in contact therewith.

Figures 2 and 3 show modifications of the arrangement of the sections of armature winding 8 in open polygon-zigzag connection and closed polygon-zigzag connection respectively. The embodiments shown in such figures, although operating substantially as previously described with relation to Figure 1, may, offer desirable manufacturing advantages in the way of slot distribution of the winding sections and desirable operating advantages in the way of more equal current distribution and better distribution of armature reactance.

Figure 4 illustrates a modification of the invention in which the armature winding is divided into Y-connected portions 8 and 8a having the neutral points VII and VIII interconnected by an auto-transformer 33. Each of the winding sections thus carries current for twice the length of time possible in the type of armature winding shown in Fig. 2. The winding is thus utilized more fully and may be made smaller or may be supplied at higher current strengths than was the case heretofore. The reactance of the auto-transformer improves the operation of the winding by suppressing the higher harmonics therein.

Although but a few embodiments of the present invention have been illustrated and described, it will be apparent to those skilled in the art that various changes and modifications may be made therein without depart-

The invention claimed is:

1. In a system for commutating the current supply to a direct current motor having an armature winding divided into a plurality of connected sections arranged upon a shaft and field windings arranged adjacent the armature winding, the armature winding sections having a neutral point, a source of direct current supply, the armature winding sections being connected in double Y portions, an auto-transformer interconnecting the armature portions, said source of direct current supply being connected with said auto-transformer, electric valves connected between the segments of the armature winding to control the supply of direct current thereto, means for controlling the flow of current through said valves, a source of alternating current, means for superposing the alternating current upon the direct current supply, and a switch controlling the connection of said source of direct current supply with the motor.

2. In a commutating system for electric motors, an armature winding divided into a plurality of star-connected phase sections, the said star connection constituting a neutral point for said winding, a source of direct current supply for energizing said winding connected thereto at said neutral point, an electric valve for each of said phase sections operable to establish operating circuit for the flow of said current therethrough to energize the said winding, means for controlling the flow of said current through said valves, a source of alternating current, and means for superimposing said alternating current upon said direct current to thereby cause interruption of said flow of said direct current through said winding sections by way of said valves.

3. In a commutating system for electric motors, an armature winding divided into a plurality of star-connected phase sections, the said star connection constituting a neutral point for said winding, a source of direct current supply for energizing said winding connected thereto at said neutral point, a single electric valve for each of said phase sections operable to establish and interrupt circuit for the flow of said current therethrough to energize said winding, means for controlling said valves to cause flow of said current therethrough, a source of alternating current, and means for superimposing said alternating current upon said direct current to thereby cause said valve to interrupt flow of said direct current through said winding sections.

4. In a commutating system for electric motors, an armature winding divided into a plurality of star-connected phase sections, each of said sections comprising a plurality of portions connected in zigzag and the said star connection thereof constituting a neutral point for said winding, a source of direct current supply for energizing said winding connected thereto at said neutral point, an electric valve for each of said phase sections operable to establish and interrupt circuit for the flow of said current therethrough to energize said winding, means for controlling said valves to cause flow of said current therethrough, a source of alternating current, and means for superimposing said alternating current upon said direct current to thereby cause interruption of flow of said currents through said winding sections by way of said valves.

5. In a commutating system for electric motors, an armature winding comprising a plurality of sections arranged as a star-closed-polygon, the polygon sections having a plurality of connection points and the star point constituting a neutral point for said winding, a source of direct current supply for energizing said winding connected thereto at said neutral point, an electric valve connected with each said connection point operable to establish and interrupt circuit for flow of said current therethrough to energize said winding, means for controlling said valves to cause flow of current therethrough, a source of alternating current, and means for superimposing said alternating current upon said direct current to thereby cause interruption of flow of said currents through said winding sections by way of said valves.

6. In a commutating system for electric motors, an armature winding comprising a plurality of sections arranged and connected as a plurality of Y-connected groups connected as a plurality of star-connected groups, the star connection constituting a neutral point for said winding, a source of direct current supply for energizing said winding connected thereto at said neutral point, an electric valve connected with each of said Y terminal sections of said winding operable to establish and interrupt circuit for flow of current therethrough to energize the respective said Y-star sections, means for controlling said valves to cause flow of current sequentially therethrough, a source of alternating current, and means for superimposing said alternating current upon said direct current to thereby cause interruption of flow of said currents through said winding sections by way of said valves.

7. In a commutating system for electric motors, an armature winding divided into a plurality of star-connected-zigzag-closed-polygon-sections, the said polygon sections having a plurality of connection points and the said star connection constituting a neutral point for said winding, a source of direct current supply for energizing said winding connected thereto at said neutral point, an electric valve for each of said polygon connection points operable to establish and interrupt circuit for the flow of said current therethrough to energize said winding, means for controlling said valves to cause flow of said current sequentially therethorough, a source of alternating current, and means for superimposing said alternating current upon said direct current to thereby cause interruption of flow of said currents through said winding sections by way of said valves.

In testimony whereof I have signed my name to this specification.

ERWIN KERN.